Patented Apr. 10, 1928.

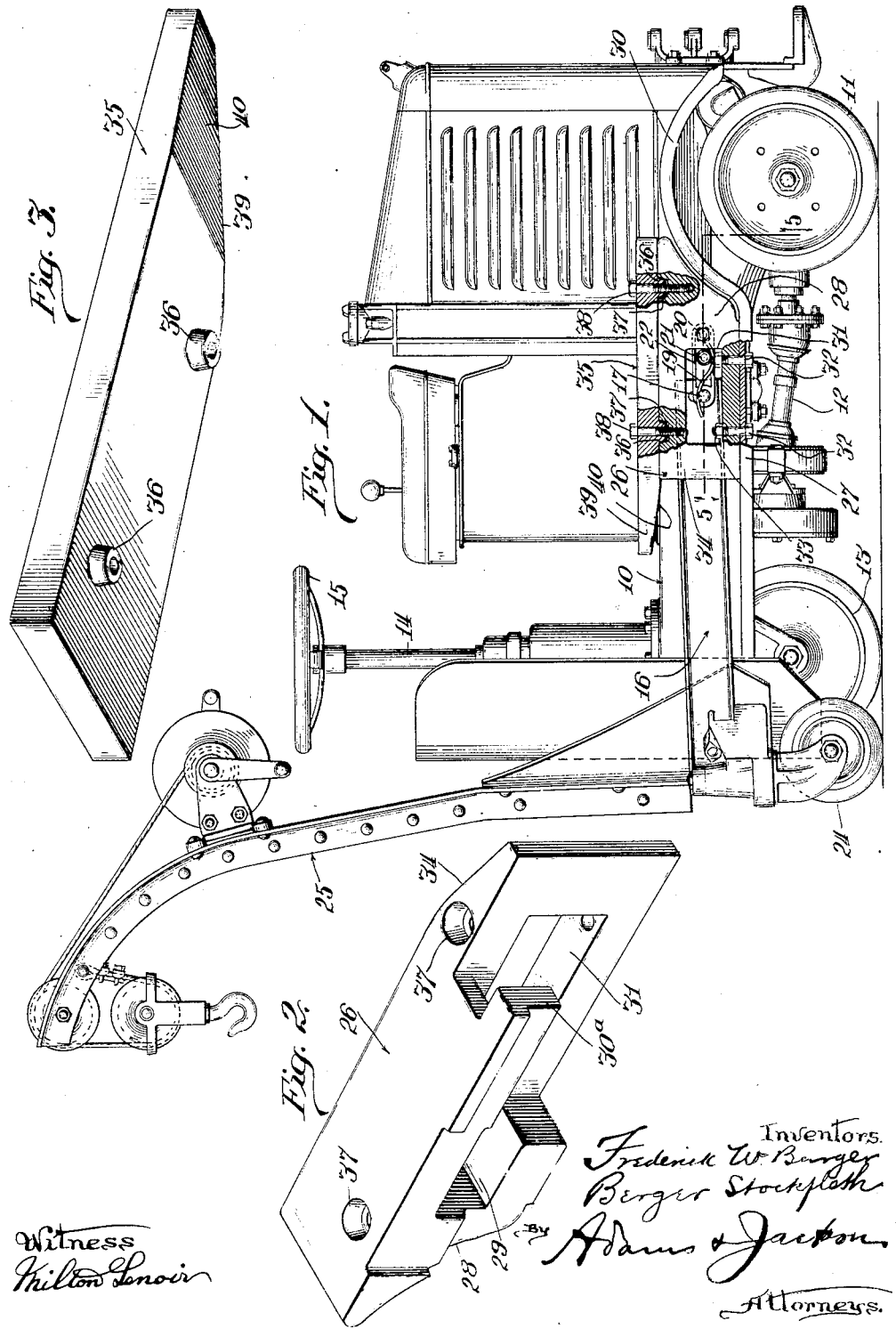

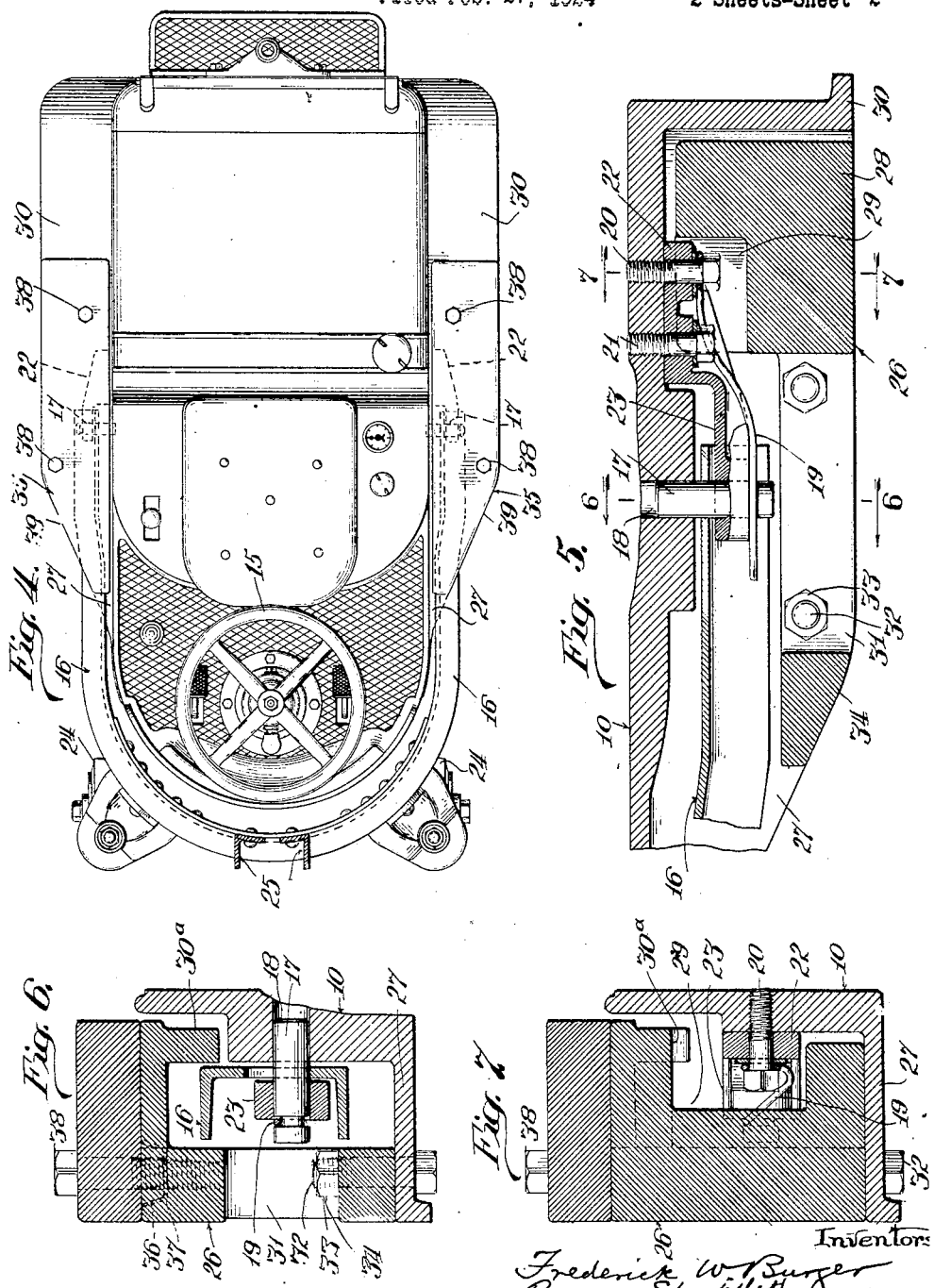

1,665,684

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

SHOP TRACTOR.

Application filed February 27, 1924. Serial No. 695,537.

This invention relates to improvements in that type of motor vehicle generally known in the trade as a shop tractor, it being one that is employed in and around shops and other places for pulling or pushing from place to place trucks that are used for transporting various articles. The chassis or supporting frame of such a tractor is ordinarily made of a weight very much greater than is frequently necessary for effective traction, but it is made of such excess weight in order that its supporting wheels may have the required traction whenever the pull-bar weight imposed upon it may be of the maximum amount. So making the frame very heavy to allow for the necessary traction in case of the maximum weight at the pull-bar, of course adds very materially to the initial cost of the machine and, also, when the loads being moved are comparatively light, will increase the cost of operation over what such cost should be if the weight of such frame were in proportion to such comparatively light loads, for, of course, the greater the weight to be moved the greater the expenditure of motive power.

It is an object of our invention to so construct the supporting frame of such a tractor that additional weight may be readily applied to it or removed from it so that its wheels will have the proper traction under any and all pull-bar loads and yet not be excessively heavy when comparatively light loads only are to be moved. As shown herein and also in our pending application, Serial No. 683,719, filed December 31, 1923, we combine with the tractor frame another frame that acts to support at the front of the machine a lifting mechanism, and with such device attached to the tractor and with the lifting mechanism carrying a heavy load the rear end of the tractor is in danger of being raised off of the floor. It is therefore a further object of the invention to so arrange the removable weighting members on the tractor that they will increase the effective weight of the tractor in such manner that it will not be apt to be tilted on account of the strain imparted to it by a heavy load on the lifting mechanism that such supplemental frame supports, and also will be disposed substantially in the longitudinal vertical planes of the driving wheels and therefore will not increase the width of the tractor. To these ends we so construct such weighting members that they may be mounted on and secured to the running boards or steps at the sides of the tractor frame without interfering with the pivotal attachment of the supplemental frame to the frame of the tractor or with the desired independent movement of such supplemental frame on its pivots that connect it with the tractor frame. Still another object of the invention is to so construct the running boards or steps of the tractor and the weighting members that are supported thereon that they will have their outer margins so inclined as to prevent the tractor from being stopped with a severe jerk, or possibly overturned, by coming in contact with a post, pillar or other obstruction at one side of the path of travel of the machine. These objects we accomplish by the construction and arrangement of parts shown in the drawings and hereinafter described. That which is believed to be new will be set forth in the claims.

In the drawings,—

Fig. 1 is a side elevation of a shop tractor with which is connected a frame that supports a lifting mechanism, the view also showing the weighting members that are removably mounted on the running board or step of the tractor frame, parts of such weighting members being broken away to show the manner of attaching them in place;

Fig. 2 is a perspective view of the lower one of the weighting members;

Fig. 3 is a perspective view of the upper one of the weighting members;

Fig. 4 is a plan view of the parts shown in Fig. 1 with the lifting mechanism omitted;

Fig. 5 is an enlarged horizontal section taken at line 5—5 of Fig. 1; and

Figs. 6 and 7 are vertical sections taken respectively at the lines 6—6 and 7—7 of Fig. 5.

Referring to the several figures of the drawings,—10 indicates the main frame of a motor vehicle of the type employing an internal combustion engine as the motive power, and also of the type which is generally known as a shop tractor,—such main frame being preferably formed of a single casting. Upon the frame is mounted a removable hood or casing which encloses the motor and other operating parts. The details of the tractor construction need not be entered into, as in and by themselves they form no part of the present invention, and indeed may vary widely in construction and arrangement. The tractor shown has two supporting wheels at its rear end, one of which is shown in Fig. 1 and indicated by 11. The rear axle is driven from the engine by suitable driving mechanism which comprises a sectional propeller shaft 12, the sections of which are connected together as usual by universal couplings, but as the driving means form no part of the present invention the details thereof are not shown. The front end of the frame is supported by a single wheel 13 which is controlled for steering purposes by means of a steering post 14, to the upper end of which is affixed an ordinary steering wheel 15. 16 indicates a supplemental frame which, as best shown in Fig. 4, is yoke-shaped and has each of its arms pivotally attached to the tractor frame 10 by being mounted upon a heavy stud 17 that lies within and projects outwardly from a hole 18 in a thickened portion of the adjacent side bar member of the tractor frame. As explained in our said application, Serial No. 683,719, each of these studs is held in place by a heavy spring rod 19 that bears at its free end upon the outer end portion of the stud, such spring being made fast to a bolt 20 and put under tension by passing under the head of another bolt 21, both of said bolts acting also to secure in place a heavy bracket 22 that has an arm portion 23 that aids in supporting the stud 17. These parts are herein shown and briefly described only because of the fact that the lower weighting member hereinafter described is so shaped as not to interfere with such parts. The supplemental frame is provided with two supporting caster wheels 24 located respectively at opposite sides of the longitudinal center of the machine and adjacent to the forward end of the supplemental frame. It is also provided with a lifting mechanism, here indicated generally by 25, and which, as in our said pending application, is represented as an ordinary crane provided with a hand-operated windlass, but which, as also stated in connection with said other application, is intended only as one of many forms of lifting or other mechanisms that may be employed in connection with the supplemental frame 16.

For the reasons hereinbefore stated, it is very desirable to provide means for giving additional weight to the machine as a whole which may be readily connected with and disconnected from the tractor frame, and to that end we have provided weighting members for each side of the machine, such weighting members being so constructed that when applied in place they will not only effectively increase the traction of the wheels 11, but will be so located as to form counter-weights that will hold the machine as a whole from tipping forward when a supplemental frame, such as 16, is employed for the purpose of carrying heavy loads by means of the lifting mechanism that is carried by such supplemental frame. The set of weighting members for the two sides of the machine are alike, except for the fact that they are made in rights and lefts, as will be understood, and hence a description of one set will suffice.

As here shown, two weighting members are employed at each side, and the lower weighting member is indicated generally by 26. As here shown, it comprises a long, heavy casting adapted to rest upon one of the running boards or steps 27 of the tractor, which running boards or steps are preferably cast with the frame 10. The rear end portion of the weighting member is in the form of a solid block 28, as best shown in Fig. 5, and in the inner face of such block portion is a recess 29 into which projects the bracket 22 and the bolts 20 and 21 that give support to the spring 19 before referred to. This rear end portion is curved on its lower face to conform approximately to the curvature of the adjacent rear-wheel fender 30 which it partially overlies, as clearly shown in Fig. 1, which fender forms an integral continuation of the running board or step. So arranging and constructing this weighting member thus applies the greatest weight to the tractor closely adjacent to the driving wheels, which, of course, is what is desired not only from the standpoint of securing better traction, but as also applying the additional weight to the best advantage for counterbalancing purposes, as above mentioned. Furthermore the weighting members are thereby located substantially in the longitudinal vertical planes of the driving wheels so that they do not increase the width of the tractor. Forward of the heavy rear end portion 28 this weighting member is cored out to receive the rear end portion of one of the pivoted arms of the supplemental wheeled frame 16 that carries the lifting mechanism. The inner wall of the weighting member 26 forward of the said recess 29 is here shown as cut away or formed so as to constitute a downwardly extending flange 30$^a$ (see Figs. 6 and 7) that overhangs the thickened portion of the tractor frame in which is formed the hole for the heavy stud 17. In the front wall of this weighting member is an oblong opening 31 which lies opposite the said stud so that, if desired, such stud can be inserted or removed without having to disturb the fastening that secures the weighting member to the tractor frame. Such fastening means, as here shown, are bolts 32 and nuts 33 thereon, the bolts passing through the lower wall of such opening and through the running board or step 27, as best shown in Fig. 6. Through this opening access can also be had to the nuts on the bolts 32 for the purpose of securing the member 26 in place or when such member is to be removed. Each running board or step has, as shown, the forward portion of its edge inclined outwardly from front to rear, and the forward portion of the outer face of the member 26 is similarly inclined so that when such weighting member is in place upon the running board or step, such inclined portions of the two parts will coincide. The inclined face portion of the member 26 is indicated by 34. Giving to these parts the inclines mention is of advantage in that in case the machine strikes a post, pillar or other obstruction at one side of the path of travel of the machine, it will be deflected to one side of such obstruction, whereas if the front end of the step and the front end of the weighting member were not tapered the machine would be arrested suddenly and it would be severely shaken and possibly overturned.

Under many operating conditions sufficient added weight will be imposed upon the frame of the tractor to secure the desired results when only the members 26 are used, but we provide for the imposition of additional weight by means of a second weighting member which is here indicated by 35. As here shown, this member 35 is in the form of a heavy, flat casting that rests upon the upper surface of the member 26, and to ensure proper positioning of the part 35 there are provided on its lower face two studs 36 which enter correspondingly shaped openings 37 in the top wall of the member 26, and, as clearly shown in Fig. 1, bolts 38 that pass through the member 35 and the studs 36 and engage tapped openings in the member 26 are employed to secure the two weighting members together. The outer edge of the members 35 is inclined to correspond to the inclination of the forward portion of the side face of the member 26 and the forward portion of the running board or step 27, and cooperates with those inclined portions in warding off danger from contact with obstructions. This inclined edge portion is clearly shown at 39 in Fig. 3. This upper weighting member 35 is longer than the lower one, and where it projects past the forward end of the member 26 its lower face is inclined forwardly and upwardly, as at 40, this being for the purpose of permitting the maximum amount of desirable upward movement of the supplemental frame 16 when its wheels 14 pass over a considerable bump or obstruction.

By our invention we are able to secure the desired additional weight for traction purposes upon the tractor when such additional weight is needed, and also, when in connection with the tractor there is employed the supplemental frame that carries an elevating mechanism, such weighting members will furnish the desired counter-balancing means for the load imposed upon the lifting mechanism. Also, the construction described enables the supplemental frame to be readily connected with the tractor frame at any time when the weighting members are in place, and also to be removed or disconnected without having to disconnect such weighting members.

What we claim as our invention and desire to secure by Letters Patent, is—

1. The combination with a shop tractor frame having at each side a running board or step and a curved fender over one of the rear wheels of the tractor, of a weighting member located on each of said running boards or steps and projecting at one end over the adjacent wheel of the tractor.

2. The combination with a shop tractor frame having at each side a running board or step, of a weighting member located on each of said running boards or steps, each weighting member having an opening in its outer face, and means accessible through such opening for securing the weighting member in place.

3. The combination with a shop tractor frame having at each side a running board or step, of a plurality of weighting members located on each of said running boards or steps, means for detachably connecting one of said members to its running board or step, and other means for detachably connecting the two members to each other.

4. The combination of a shop tractor frame having at each side a running board or step, a supplemental frame comprising side bar members extending respectively over said running boards or steps and pivotally connected with said tractor frame, and a weighting member resting on each running board or step, said weighting members being recessed to permit rising and falling movements of the pivoted supplemental frame.

5. The combination of a shop tractor frame having at each side a running board or step, a supplemental frame comprising side bar members extending respectively over said running boards or steps and pivotally connected with said tractor frame, a weighting member resting on each running board or step, said weighting member being recessed to permit pivotal movements of the said supplemental frame, and another weighting member resting on said first-named weighting member and projecting beyond the front end of said first-named weighting member, the projecting portion of the upper weighting member being inclined upwardly and forwardly.

6. The combination with a shop tractor frame having at each side a running board or step the forward portion of the edge of which is inclined outwardly from front to rear, of a weighting member mounted on each of said running boards or steps and having the front portion of its outer face inclined to substantially correspond with the inclined edge portion of the running board or step on which said member is supported.

FREDERICK W. BURGER.
BERGER STOCKFLETH.